(12) United States Patent
Futamata et al.

(10) Patent No.: US 9,802,198 B2
(45) Date of Patent: Oct. 31, 2017

(54) VALVE DEVICE

(71) Applicant: SUMITOMO RUBBER INDUSTRIES, LTD., Kobe-shi, Hyogo (JP)

(72) Inventors: Kazuo Futamata, Kobe (JP); Takeshi Ishimaru, Kobe (JP); Kouhei Morita, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/039,297

(22) PCT Filed: Oct. 1, 2014

(86) PCT No.: PCT/JP2014/076312
§ 371 (c)(1),
(2) Date: May 25, 2016

(87) PCT Pub. No.: WO2015/079800
PCT Pub. Date: Jun. 4, 2015

(65) Prior Publication Data
US 2016/0367990 A1    Dec. 22, 2016

(30) Foreign Application Priority Data
Nov. 26, 2013  (JP) ................... 2013-244197

(51) Int. Cl.
*B01L 3/00*    (2006.01)
*F16K 11/052*    (2006.01)
(Continued)

(52) U.S. Cl.
CPC ............... *B01L 3/567* (2013.01); *F16K 7/14* (2013.01); *F16K 7/16* (2013.01); *F16K 11/022* (2013.01);
(Continued)

(58) Field of Classification Search
CPC . B01L 3/567; F16K 7/14; F16K 11/04; F16K 11/052; F16K 11/0525; F16K 27/0263; F16K 31/0641; Y10T 137/86501
See application file for complete search history.

(56) References Cited

U.S. PATENT DOCUMENTS

| 4,986,308 | A | * | 1/1991 | Champseaux | ............ | F16K 7/16 |
| | | | | | | 137/625.44 |
| 5,027,857 | A | * | 7/1991 | Champseix | ............... | F16K 7/16 |
| | | | | | | 137/625.44 |

(Continued)

FOREIGN PATENT DOCUMENTS

| DE | 2 123 914 A1 | 11/1972 |
| DE | 10 2012 005 122 A1 | 9/2013 |

(Continued)

OTHER PUBLICATIONS

International Search Report issued in PCT/JP2014/076312 dated Dec. 22, 2014.

(Continued)

*Primary Examiner* — Craig Schneider
*Assistant Examiner* — Kevin Barss
(74) *Attorney, Agent, or Firm* — Birch, Stewart, Kolasch & Birch, LLP

(57) ABSTRACT

A recess 22 provided in a passage block 20; a diaphragm covering the recess 22 to form a valve chest 21 in which a fluid flows; an inflow port 23 opened at the recess 22 and allowing the fluid to flow into the valve chest 21; an NC outflow port 24 and an NO outflow port 25 opened at the recess 22 and allowing the fluid to flow out from the valve chest 21; by oscillating the diaphragm, the diaphragm is closely fitted to any one of a first valve seat 24b formed by an opening 24a of the NC outflow port 24 and a second valve seat 25b formed by an opening 25a of the second outflow port 25, to allow the fluid in the valve chest 21 to flow out (Continued)

from the other outflow port. The recess 22 has a first inclined portion 81 and a second inclined portion 82 having a depth gradually increasing from the first valve seat 24b and the second valve seat 25b toward the inflow opening 23.

12 Claims, 8 Drawing Sheets

(51) Int. Cl.
  *F16K 27/02* (2006.01)
  *F16K 31/06* (2006.01)
  *F16K 7/14* (2006.01)
  *F16K 11/04* (2006.01)
  *F16K 7/16* (2006.01)
  *F16K 11/02* (2006.01)
(52) U.S. Cl.
  CPC ............ *F16K 11/04* (2013.01); *F16K 11/052* (2013.01); *F16K 11/0525* (2013.01); *F16K 27/0263* (2013.01); *F16K 31/0641* (2013.01); *B01L 2200/0605* (2013.01); *B01L 2400/0638* (2013.01)

(56) References Cited

U.S. PATENT DOCUMENTS

| | | | |
|---|---|---|---|
| 5,199,462 A | 4/1993 | Baker | |
| 5,337,785 A * | 8/1994 | Romer | F16K 7/16 137/596.17 |
| 5,983,941 A * | 11/1999 | Fritz | F16K 11/052 137/625.44 |
| 6,003,552 A * | 12/1999 | Shank | F16K 7/16 137/625.44 |
| 6,220,299 B1 * | 4/2001 | Arvidsson | F16K 7/16 137/329.05 |
| 6,318,408 B1 * | 11/2001 | Fukano | F15B 13/0405 137/625.44 |
| 6,394,136 B1 * | 5/2002 | Rohrbeck | F16K 11/052 137/625.44 |
| 6,484,754 B1 * | 11/2002 | Muth | F16K 11/052 137/625.44 |
| 6,726,173 B2 * | 4/2004 | Hettinger | F16K 31/0682 251/129.17 |
| 7,070,162 B2 * | 7/2006 | Dzialakiewicz | F16K 31/0682 251/129.08 |
| 7,779,867 B2 * | 8/2010 | Bai | F16K 7/14 137/625.44 |
| 8,434,514 B2 * | 5/2013 | Bezold | F16K 11/022 137/625.44 |
| 8,752,584 B2 * | 6/2014 | Grandvallet | F16K 31/0603 137/553 |
| 8,893,747 B2 * | 11/2014 | Weiβ | F16K 31/06 137/625.44 |
| 9,091,368 B2 * | 7/2015 | Scheibe | F16K 31/52 |
| 2016/0091099 A1 * | 3/2016 | Scheibe | F16K 7/12 137/625.48 |

FOREIGN PATENT DOCUMENTS

| | | |
|---|---|---|
| EP | 0780611 A1 | 6/1997 |
| JP | 06-207678 A | 7/1994 |
| JP | 2002-502486 A | 1/2002 |
| JP | 2004-144243 A | 5/2004 |
| JP | 2005-163924 A | 6/2005 |
| JP | 2006-057644 A | 3/2006 |

OTHER PUBLICATIONS

Written Opinion of the International Searching Authority issued in PCT/JP2014/076312 dated Dec. 22, 2014.
Extended European Search Report, dated Jul. 7, 2017, for European Application No. 14865560.8.

* cited by examiner (a)

(b)

(a)

(b)

VALVE DEVICE

TECHNICAL FIELD

The present invention relates to a valve device to be used in various analyzing devices such as a chemical testing device, an environment analyzing device, and a biotechnology research device.

BACKGROUND ART

In the various analyzing devices, important problems are an improvement of measurement accuracy, an improvement of an inspecting speed, minimization of a specimen and a reagent, and downsizing of a device, and a valve device for controlling a flow rate of a fluid used in measurement is required to be further improved in its performance. Such a valve device employs a diaphragm as a valve opening/closing mechanism in order to realize excellent chemical resistance. The diaphragm forms a bulkhead that divides a valve chest, and receives an external driving force to switch fluid passages.

In this kind of valve device, the housing is provided with one inflow port and two outflow ports so as to communicate with the valve chest. When the diaphragm oscillates, any one of the outflow ports is closed and the other outflow port is opened, and the fluid passages are switched. However, according to elastic deformation of the diaphragm at a time of the passage switching operation, the internal volume of the valve chest changes, and a fluid whose amount corresponds to a variation of the internal volume (pumping volume) is pushed out to the outflow port. For this reason, it is difficult to improve accuracy of the flow rate.

Therefore, conventionally, a method for reducing a membrane portion which controls expansion and contraction of the diaphragm has been examined in order to decrease the pumping volume. However, even if such method is employed, the pumping volume can not be sufficiently decreased. Thus, a method for further decreasing the pumping volume has been demanded. On the other hand, according to the decrease of the membrane portion, a partial expansion/contraction rate of the membrane portion is increased, therefore, a problem occurs such that the life of the diaphragm is shortened. Thus, a new method for decreasing the pumping volume has been sought.

Under the circumstances, the following Patent Literature 1 discloses a valve device in which the area of an inflow port is set to be twice or more of the area of an outflow port.

PRIOR ART DOCUMENT

Patent Literature

Patent Literature 1: Japanese Patent No. 4252512

In the above-mentioned valve device, however, when the cross-section area of the inflow port is greatly different from the cross-section area of the outflow port, a difference in the flow rate occurs between the fluid flowing near the inflow port and the fluid flowing near the outflow port, therefore, it is difficult to precisely control the flow rate of the fluid flowing out from the outflow port by controlling the flow rate of the fluid flowing into the inflow port.

SUMMARY OF THE INVENTION

Problem to be Solved by the Invention

The present invention is devised from the above viewpoint and its main object is to provide a valve device which can decrease a pumping volume and accurately control a flow rate without making a large difference between the cross-section area of an inflow port and the cross-section area of an outflow port.

Means for Solving the Problems

The present invention is a valve device comprising
a recess provided in a casing;
a diaphragm covering the recess so as to form a valve chest as a space between the recess and the diaphragm in which a fluid flows;
an inflow port opened at the recess and allowing the fluid to flow into the valve chest;
an outflow port opened at the recess and allowing the fluid to flow out from the valve chest; and
a diaphragm driving means for oscillating the diaphragm to allow the diaphragm to closely fit to or separate from a valve seat formed by an opening of the outflow port so as to shut or open the outflow port,
and characterized in that
the recess has an inclined portion whose depth gradually increases from the valve seat side toward an inflow opening where the inflow port communicates with the valve chest,
the valve chest has a vertical direction in which the outflow port and the inflow port are arranged, and a width direction orthogonal to the vertical direction and the direction of the depth, and
by providing a first protrusion on each side of the inflow opening in the width direction, the inclined portion has a taper shape whose width gradually increases from the inflow opening toward the valve seat.

In the valve device according to the present invention, it is desirable that, from the both sides of the valve chest in the width direction toward the inflow opening, the first protrusions are gradually increased in the inclination with respect to a plane passing through the inflow opening.

In the valve device according to the present invention, it is desirable that the outflow port is provided as a dual system including a first outflow port and a second outflow port,
the diaphragm driving means oscillates the diaphragm so as to allow the diaphragm to closely fit to any one of a first valve seat formed by an opening of the first outflow port and a second valve seat formed by an opening of the second outflow port, and thereby the fluid in the valve chest is allowed to flow out from the other side of the first outflow port or the second outflow port,
the recess has a first inclined portion whose depth gradually increases from the first valve seat side toward the inflow opening where the inflow port communicates with the valve chest, and a second inclined portion whose depth gradually increases from the second valve seat side toward the inflow opening,
the first outflow port, the inflow port, and the second outflow port are disposed in this order,
the first inclined portion and the second inclined portion are gradually increased in the width from the inflow opening toward the first valve seat and the second valve seat.

In the valve device according to the present invention, it is desirable that the inclined portion has a taper angle of 30 to 60 degrees in a plan view viewed from the diaphragm side.

In the valve device according to the present invention, it is desirable that, in a peripheral edge of the recess, a holding surface closely fitting to the diaphragm and holding the diaphragm is formed, and the depth from the holding surface to the first protrusions is more than 0 mm.

In the valve device according to the present invention, it is desirable that the inclined portion is provided with a second protrusion protruding toward the diaphragm.

In the valve device according to the present invention, it is desirable that a depth of the inflow opening is more than a depth of the valve seat.

In the valve device according to the present invention, it is desirable that the difference between the depth of the inflow opening and the depth of the valve seat is 0.3 mm or more.

In the valve device according to the present invention, it is desirable that the valve seat protrudes toward the diaphragm.

In the valve device according to the present invention, it is desirable that the inclined portion inclines at an angle of 3 degrees to 15 degrees with respect to the plane passing through the inflow opening.

In the valve device according to the present invention, it is desirable that the casing includes a first block on which the recess is formed and a second block fixed to the first block and holding the diaphragm, and when a mating surface between the first block and the second block is used as a reference surface, the depth DA of the valve seat is 1.5 mm to 2.5 mm, and the depth DB of the inflow opening is 2.0 mm to 3.0 mm.

In the valve device according to the present invention, it is desirable that the diaphragm driving means includes a coil and a plunger giving displacement to the diaphragm when the coil is electrified.

Effects of the Invention

In the valve device of the present invention, since the recess is formed with the inclined portion whose depth from the diaphragm gradually increases from the valve seat side toward the inflow opening, an internal volume of the valve chest increases. As a result, a proportion of a pumping volume to the internal volume of the valve chest becomes small, and most fluctuation of the internal volume of the valve chest according to the oscillation of the diaphragm is absorbed as a fluctuation of an inner pressure of the valve chest. Therefore, the pumping volume can be sufficiently reduced without making a large difference between the cross-section area of an inflow port and the cross-section area of an outflow port.

Meanwhile, if the internal volume of the valve chest is simply increased, there is concern about retention of the fluid in the valve chest. In the present invention, however, as the inclined portion is formed so that the fluid smoothly flows from the inflow opening to the valve seat, the retention of the fluid in the valve chest is suppressed. Further, as the first protrusion is provided on the both sides of the inflow opening in the width direction, the inclined portion has the taper shape such that its width gradually increases from the inflow opening toward the valve seat. Thereby, the cross-section area of the fluid passage is sufficiently secured also near the outflow opening so that the smooth flow of the fluid is not hindered, and the retention of the fluid is further suppressed.

MODE FOR CARRYING OUT THE INVENTION

An embodiment of the present invention is described below with reference to the drawings.

Figure 1:
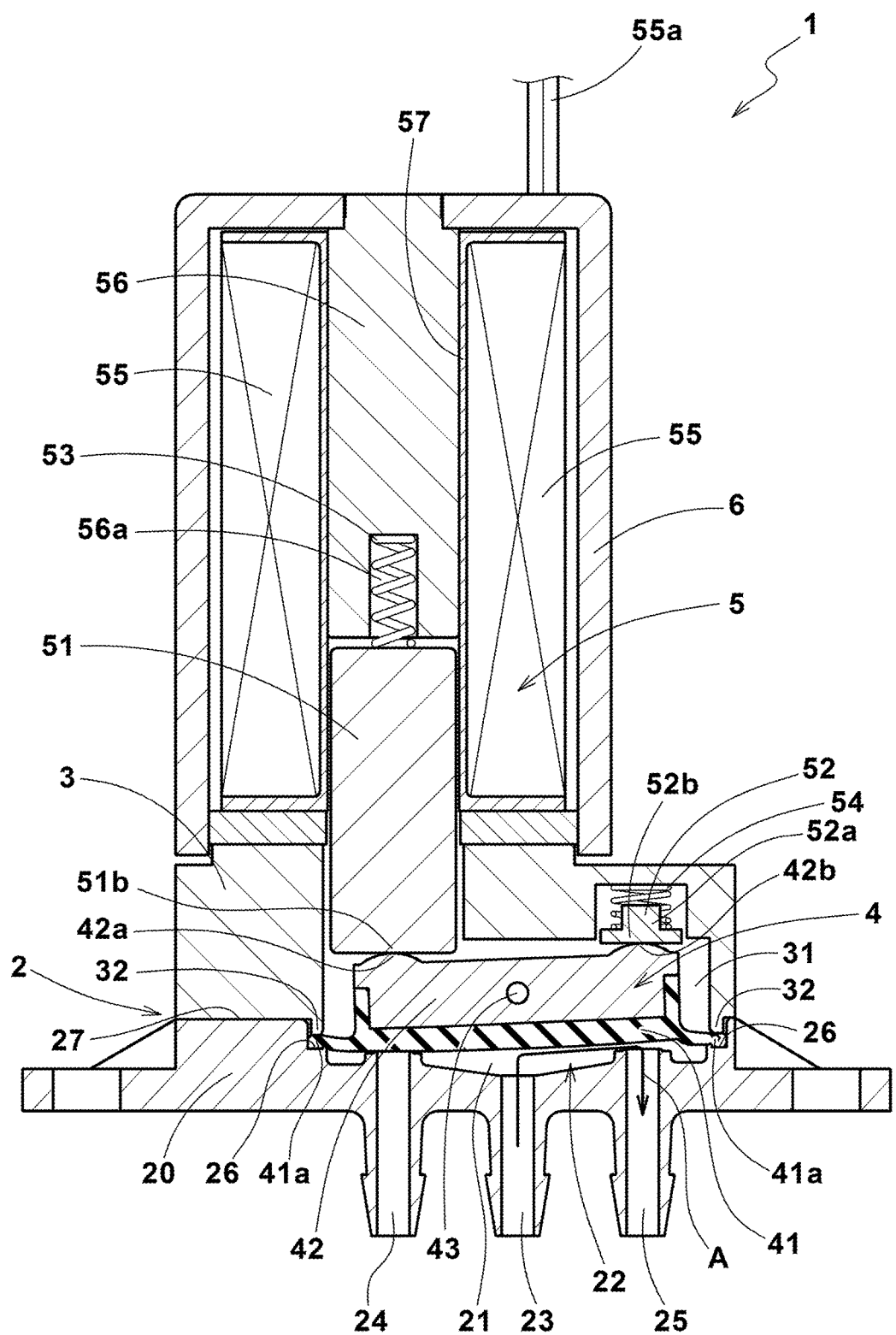
FIG. 1 A cross-section view illustrating a valve device according to an embodiment of the present invention.
Figure 2:
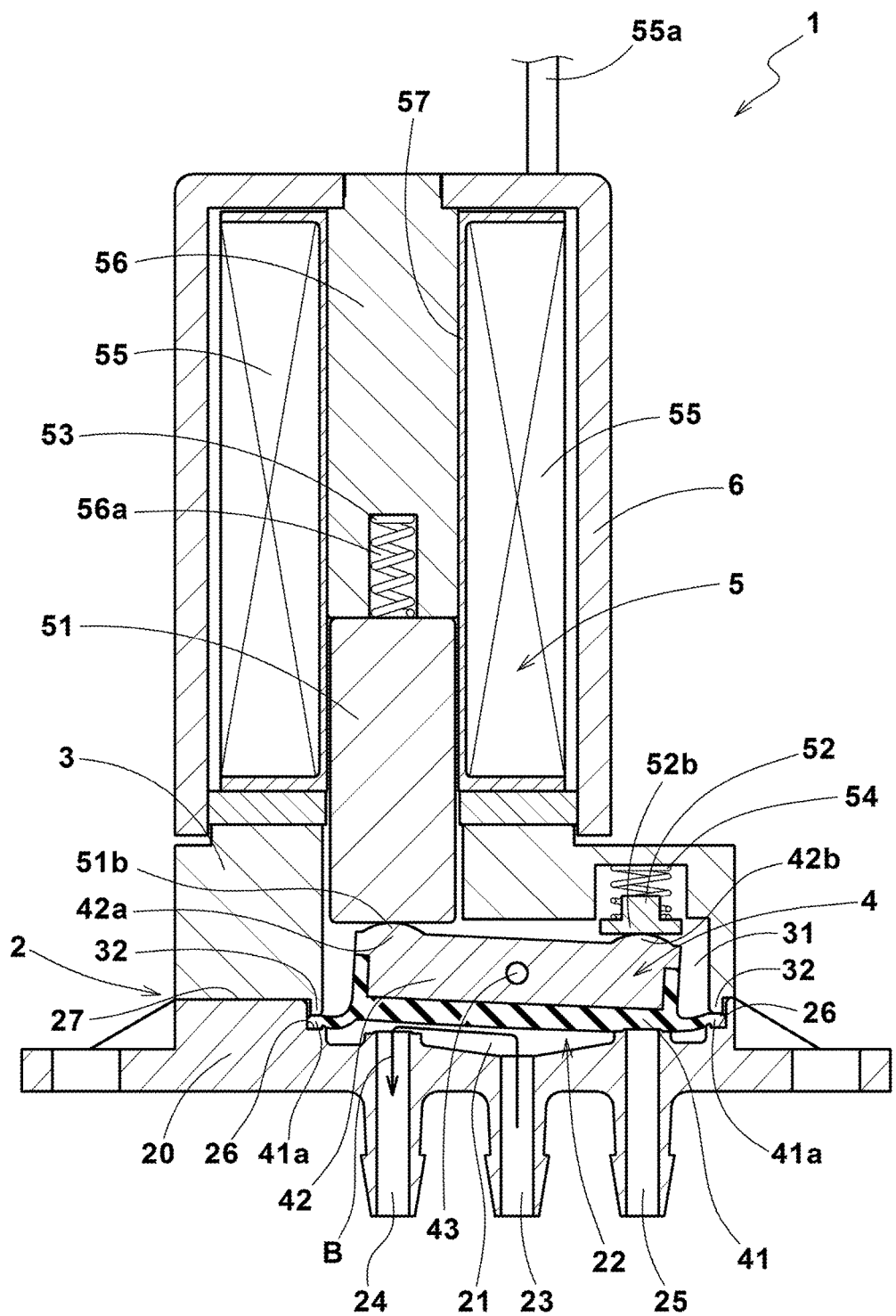
FIG. 2 A cross-section view illustrating the valve device shown in FIG. 1 in a state when a solenoid coil is electrified.

FIGS. 1 and 2 are cross-section views of a valve device 1 according to this embodiment. FIG. 1 illustrates a non-energized state where the after-mentioned solenoid coil 55 is not energized, and FIG. 2 illustrates an energized state where the solenoid coil 55 is energized.

As shown in FIGS. 1 and 2, the valve device 1 in this embodiment includes a casing 2 including a fluid passage, an oscillation valve 4 provided so as to be capable of oscillating in relation to the casing 2, a valve driving section 5 (diaphragm driving means) for driving the oscillation valve 4, and a frame 6 supporting the casing 2 and the valve driving section 5.

The casing 2 includes a passage block 20 (a first block) and a sub block 3 (a second block).

In this embodiment, the passage block 20 is formed by a resin material including any one or more of PPS (polyphenylene sulfide), PEEK (polyether ether ketone), and PBT (polybutylene terephthalate) as a resin component.

In the above resin components, the PPS is particularly preferable from a viewpoint of heat resistance, chemical resistance, and manufacturing cost.

The passage block 20 has a recess 22 forming a valve chest 21 which is a space where a fluid flows, an inflow port 23 (a Common port) communicating with the valve chest 21, an NC (Normally Close) outflow port 24 (a first outflow port) and NO (Normally Open) outflow port 25 (a second outflow port), and a holding surface 26 holding the oscillation valve 4. As shown in FIG. 1, the inflow port 23 is always opened, and a fluid is supplied from the inflow port 23 into the valve chest 21. At the normal time, the NC outflow port 24 is shut, and the NO outflow port 25 is opened. The fluid flowing from the inflow port 23 into the valve chest 21 flows along an arrow A, and flows out of the NO outflow port 25.

The sub block 3 is formed by, for example, a resin material, and the sub block has a housing portion 31 housing the oscillation valve 4 and the after-mentioned plungers 51 and 52, and a pressing section 32 pressing the oscillation valve 4 against the holding surface 26. The sub block 3 is attached to a mating surface 27 in which the recess 22 of the passage block 20 id formed, and the sub block is fixed to the passage block 20 by a screw (not shown) or the like.

The oscillation valve 4 has a diaphragm 41 having elasticity, an oscillating member 42 integrated with the diaphragm 41, and a shaft member 43 oscillatably supporting the oscillating member 42. The diaphragm 41 is formed by, for example, a rubber material, and is attached to the casing 2 so as to cover the recess 22 and form the valve chest 21 between the diaphragm 41 and the recess 22. The oscillating member 42 is formed by, for example, a resin material, and is disposed above the inflow port 23. The shaft member 43 is formed by, for example, a metallic material. The shaft member 43 is provided above the inflow port 23 so as to be substantially perpendicular to the inflow port 23, and both ends of the shaft member 43 are supported by the sub block 3.

When the oscillation valve 4 oscillates on the shaft member 43 as a rotating shaft like a seesaw, any one of the NC outflow port 24 and the NO outflow port 25 is shut, and the other port is opened. The diaphragm 41 has an outer peripheral portion 41a extending outward. The outer peripheral portion 41a is sandwiched, held, and restrained between the holding surface 26 of the passage block 20 and the pressing section 32 of the sub block 3 so as to be closely fitted to the passage block 20. Thereby, the valve chest 21 is sealed, and the fluid is prevented from leaking.

The valve driving section 5 has the first plunger (movable iron core) 51, the second plunger 52, a first coil spring 53, a second coil spring 54, the solenoid coil 55, and a fixed iron core 56. The first plunger 51 is disposed above the NC outflow port 24. The first plunger 51 is inserted into a coil bobbin 57 around which the solenoid coil 55 is wound. The first coil spring 53 is disposed in a recess 56a formed on the fixed iron core 56. One end of the first coil spring 53 touches a bottom of the recess 56a of the fixed iron core 56, and the other end touches a top surface of the first plunger 51. The first coil spring 53 pushes down the first plunger 51 toward a touch portion 42a of the oscillating member 42, and accordingly, a front end 51b of the first plunger 51 presses the touch portion 42a of the oscillating member 42. The spring load (an elastic force) of the first coil spring 53 is set so as to be larger than the spring load of the second coil spring 54.

The second plunger 52 is disposed above the NO outflow port 25. The second plunger 52 is provided with a cylindrical portion 52a into which the second coil spring 54 is inserted, and a flanged front end 52b which is formed at an edge of the cylindrical portion 52a. One end of the second coil spring 54 touches the front end 52b of the second plunger 52, and the other end touches a bottom surface of the frame 6. The second coil spring 54 pushes down the second plunger 52 toward a touch portion 42b of the oscillating member 42, and accordingly the front end 52b of the second plunger 52 presses the touch portion 42b of the oscillating member 42.

The solenoid coil 55 is wound around the cylindrical coil bobbin 57. The solenoid coil 55 generates an electromagnetic force when energized. The solenoid coil 55 is supplied with a predetermined electric current so as to generate an electromagnetic force stronger than the elastic force of the first coil spring 53.

The frame 6 is provided above the sub block 3. The frame 6 houses the first plunger 51, the first coil spring 52, the solenoid coil 55, the fixed iron core 56, and the coil bobbin 57. The solenoid coil 55, the fixed iron core 56, and the coil bobbin 57 are fixed by the frame 6.

The second coil spring 54 is disposed in a recess formed on the sub block 3. The second coil spring 54 touches a bottom of the recess of the sub block 3 so as to generate an elastic force.

A cable 55a for feeding a power to the solenoid coil 55 is led into the frame 6.

An opening-and-shutting operation of the valve device 1 is described below. Since the spring load of the first coil spring 53 is larger than the spring load of the second coil spring 54 as described above, the position of the oscillation valve 4 at the normal time is maintained such that the oscillation valve 4 is rotated in a counterclockwise direction as shown in FIG. 1, and the NC outflow port 24 is shut and the NO outflow port 25 is opened. Accordingly, as indicated by an arrow A, the fluid flowing from the inflow port 23 into the valve chest 21 is discharged from the NO outflow port 25.

On the other hand, when the solenoid coil 55 is supplied with the predetermined electric current, as shown in FIG. 2, the first plunger 51 is moved by the electromagnetic force toward such a direction that the first coil spring 53 is compressed. Accordingly, the front end 52b of the second plunger 52 presses the touch portion 42b of the oscillating member 42, and thereby the oscillation valve 4 is rotated in a clockwise direction in the drawing, and the NO outflow port 25 is shut and the NC outflow port 24 is opened. Accordingly, as indicated by an arrow B, the fluid flowing from the inflow port 23 into the valve chest 21 is discharged from the NC outflow port 24.

FIGS. 3 to 6 illustrate the passage block 20. The passage block 20 is provided with the recess 22 delimiting the valve chest 21. The recess 22 is formed to dent from the mating surface 27 to which the sub block 3 is joined.

Figure 5:
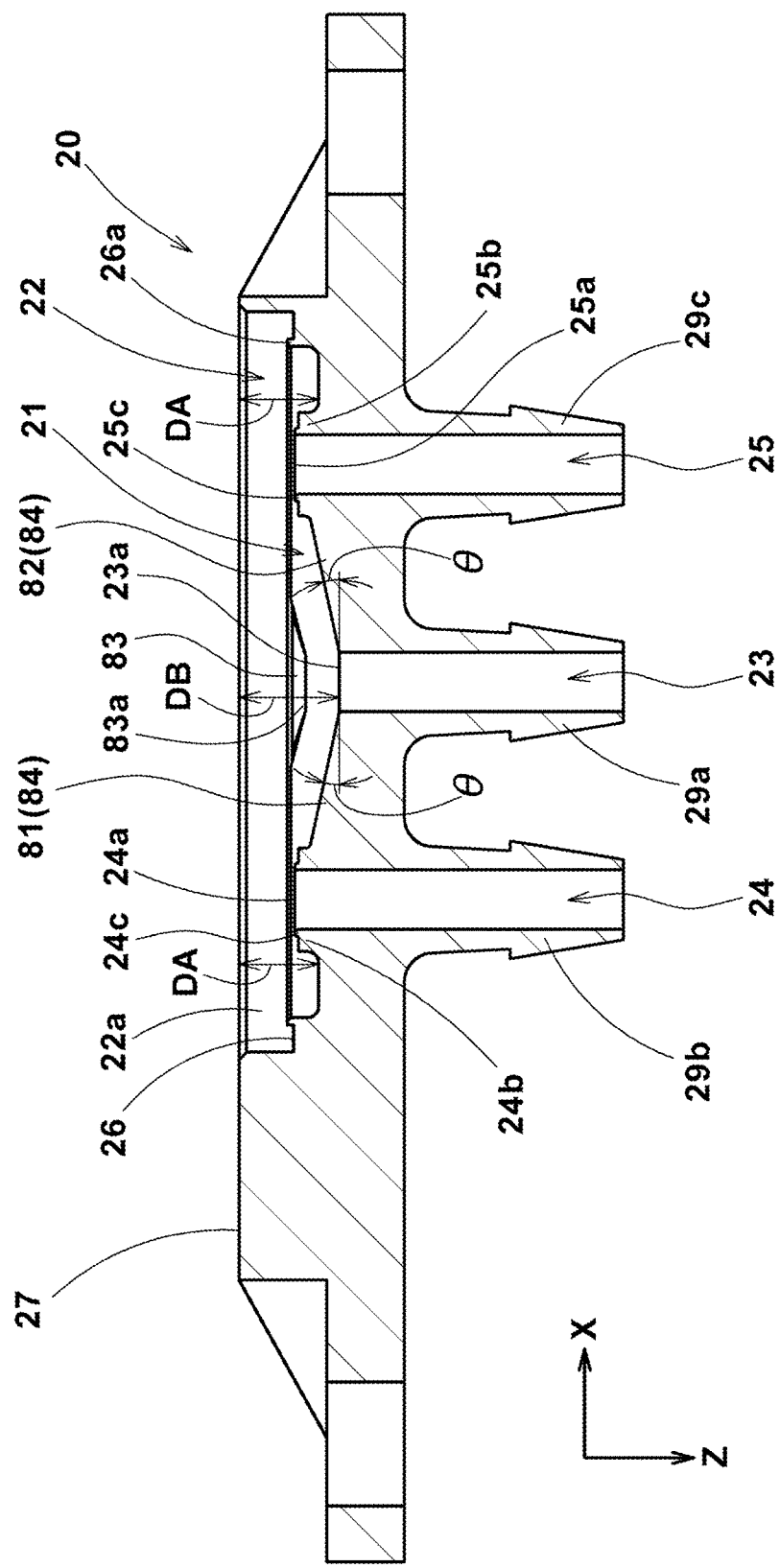
FIG. 5 A cross-section view taken along line A-A in FIG. 4.

As shown in FIG. 5, an NC outflow nipple 29b, an inflow nipple 29a, and an NO outflow nipple 29c are provided so as to protrude from a rear surface opposite to the mating surface 27.

The inflow port 23 is formed so as to penetrate the inflow nipple 29a from the recess 22. The NC outflow port 24 is formed so as to penetrate the NC outflow nipple 29b from the recess 22, and the NO outflow port 25 is formed so as to penetrate the NO outflow nipple 29c from the recess 22.

The NC outflow port 24, the inflow port 23, and the NO outflow port 25 are disposed in this order.

Hereinafter, a direction in which the NC outflow port 24, the inflow port 23, and the NO outflow port 25 are arranged is referred to as the vertical direction X, a direction in which the recess 22 is formed is referred to as the depth direction Z, and a direction orthogonal to the vertical direction X and the depth direction Z is referred to as the width direction Y.

The inflow port 23 has an inflow opening 23a opened so as to face the recess 22. The inflow opening 23a is formed so as to communicate with the valve chest 21. The inflow port 23 allows a fluid to flow from the inflow opening 23a into the valve chest 21. The NC outflow port 24 and the NO outflow port 25 also have outflow openings 24a and 25a opened so as to face the recess 22, respectively. The outflow openings 24a and 25a are formed so as to communicate with the valve chest 21, and the NC outflow port 24 and the NO outflow port 25 allow the fluid to flow out of the valve chest 21 via the outflow openings 24a and 25a.

The outflow opening 24a of the NC outflow port 24 is provided with a first valve seat 24b. The outflow opening 25a of the NO outflow port 25 is provided with a second valve seat 25b. The first valve seat 24b and the second valve seat 25b are formed into a cylindrical shape protruding toward the diaphragm 41. According to oscillation of the oscillation valve 4, the diaphragm 41 closely contacts with the first valve seat 24b or the second valve seat 25b so as to shut the NC outflow port 24 or the NO outflow port 25. At this time, the other outflow port is opened, and the fluid flowing from the inflow port 23 into the valve chest 21 is discharged out of the valve device 1 through the opened outflow port.

Since the first valve seat 24b and the second valve seat 25b are formed so as to protrude toward the diaphragm 41, the sealability, when the port is shut, between the diaphragm 41 and, the first valve seat 24b and the second valve seat 25b is improved. Thereby, when the NC outflow port 24 or the NO outflow port 25 is shut, leakage of the fluid from the valve chest 21 to the NC outflow port 24 or the NO outflow port 25 can be prevented.

The first valve seat 24b is provided in a seat surface of its front end with a first raised portion 24c raising toward the diaphragm 41. The first raised portion 24c is formed continuously in the circumferential direction on the opening side of the NC outflow port 24, namely, in an inner periphery of the first valve seat 24b. The first raised portion 24c further improves the sealability between the first valve seat 24b and the diaphragm 41 when the NC outflow port 24 is shut, so that leakage of a fluid is prevented. Similarly, a first raised portion 25c is provided also in the second valve seat 25b of the NO outflow port 25.

The holding surface 26 is formed in a peripheral edge of the recess 22. The holding surface 26 and the mating surface 27 are formed at different levels with a side wall 22a of the recess 22 interposes therebetween. The holding surface 26 is provided in its inner periphery with a second raised portion 26a raising toward the diaphragm 41. The second raised portion 26a is formed continuously in the circumferential direction. The second raised portion 26a improves a sealability between the holding surface 26 and the outer peripheral portion 41a of the diaphragm 41, so that leakage of the fluid is prevented.

In the periphery of the recess 22, a pair of through holes 28 are formed at substantially diagonal positions with respect to a main body portion 20a of the passage block 20. The passage block 20 and the sub block 3 are fixed by screws penetrating the through holes 28.

The recess 22 has a first inclined portion 81 and a second inclined portion 82.
The first inclined portion 81 is formed so that its depth from the diaphragm 41 gradually increases from the first valve seat 24b side toward the inflow opening 23a.
Similarly, the second inclined portion 82 is formed so that its depth from the diaphragm 41 gradually increases from the second valve seat 25b side toward the inflow opening 23a. The depth from the diaphragm 41 is a distance in the depth direction Z from the holding surface 26 with which the outer peripheral portion 41a of the diaphragm 41 closely contact.

By the first inclined portion 81 and the second inclined portion 82, the volume is increased in the vicinity of the inflow opening 23a, and the entire internal volume of the valve chest 21 is also increased. Thereby, the ratio of a pumping volume to the internal volume of the valve chest 21 becomes decreased, and most part of fluctuation of the internal volume of the valve chest 21 due to the oscillation of the diaphragm 41 is absorbed as a fluctuation of an interior pressure of the valve chest 21, and the pumping volume can be sufficiently reduced.
Further, since the depth of the recess 22 from the diaphragm 41 gradually reduces from the inflow opening 23a toward the outflow opening 24a due to the first inclined portion 81, a smooth passage from the inflow opening 23a to the outflow opening 24a can be obtained. As a result, the flow of the fluid in the valve chest 21 becomes smooth, and the retention of the fluid is suppressed. The same applies to the second inclined portion 82.

Since the first inclined portion 81 and the second inclined portion 82 are formed in the recess 22, when the reference surface is the mating surface 27, the depth DB of the inflow opening 23a for which becomes larger than the depth DA of the first valve seat 24b and the second valve seat 25b. In this embodiment, the difference DB−DA between the depth DB of the inflow opening 23a and the depth DA of the first valve seat 24b and the second valve seat 25b is preferably 0.3 mm or more, more preferably 0.4 mm or more. When the difference DB−DA is less than 0.3 mm, the internal volume of the valve chest 21 does not sufficiently increase, and thus the effect to reduce the pumping volume is decreased.

The depth DA of the first valve seat 24b and the second valve seat 25b is preferably 1.5 mm or more, more preferably 1.8 mm or more, and preferably 2.5 mm or less, more preferably 2.2 mm or less. When the depth DA of the first valve seat 24b and the second valve seat 25b is less than 1.5 mm, the effect to reduce the pumping volume is decreased. On the other hand, when the depth DA of the first valve seat 24b and the second valve seat 25b exceeds 2.5 mm, the internal volume of the valve chest 21 becomes excessively large, and retention of the fluid might occur.
Similarly, the depth DB of the inflow opening 23a is preferably 2.0 mm or more, more preferably 2.3 mm or more, and preferably 3.0 mm or less, more preferably 2.7 mm or less. If the depth DB of the inflow opening 23a is less than 2.0 mm, the effect to reduce the pumping volume is decreased. On the other hand, if the depth DB of the inflow opening 23a exceeds 3.0 mm, the internal volume of the valve chest 21 becomes excessively large, and retention of the fluid might occur.

In a cross section extending to the depth direction Z along the vertical direction X shown in FIG. 5, it is desirable that the inclination angle $\theta$ of the first inclined portion 81 and the second inclined portion 82 with respect to a plane passing through the inflow opening 23a is 3 degrees to 15 degrees. If the inclination angle $\theta$ is less than 3 degrees, the internal volume of the valve chest 21 does not sufficiently increase, and the effect to reduce the pumping volume is decreased. On the other hand, if the inclination angle $\theta$ exceeds 15 degrees, the internal volume of the valve chest 21 becomes excessively large, and retention of the fluid might occur.

Figure 4:
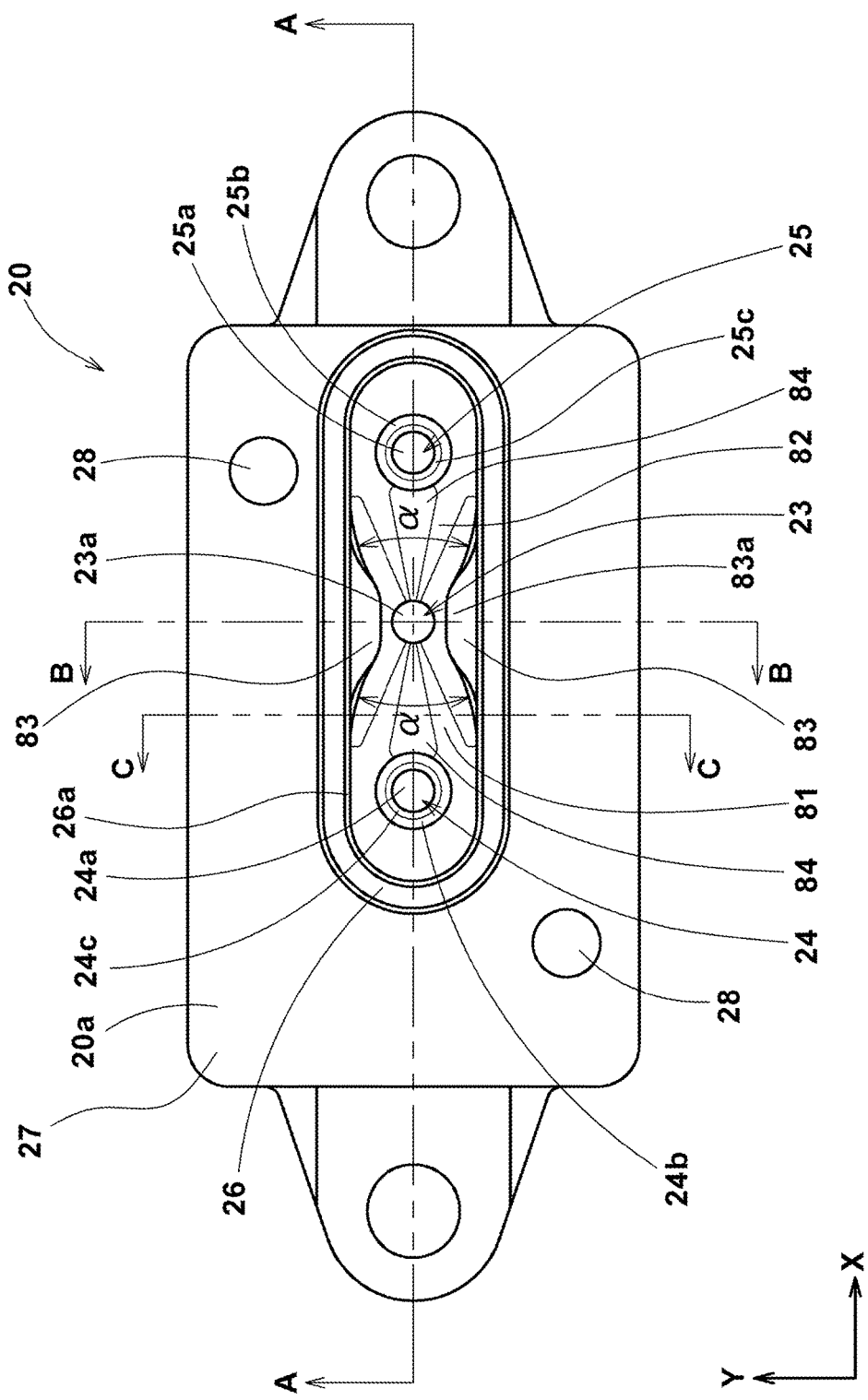
FIG. 4 A plan view of the passage block in FIG. 1 viewed from the diaphragm side.

In the recess 22, a first protrusion 83 raising toward the diaphragm 41 in the form of an embankment shape is formed. The first protrusion 83 is provided on each side of the inflow opening 23a in the width direction Y.
Due to the first protrusions 83, the valve chest 21 has a gourd shape (dumbbell shape) in the plan view.
The first inclined portion 81 and the second inclined portion 82 are formed into slope shapes such that their depths from the holding surface 26 gradually decrease toward the first protrusions 83.
As the first protrusions 83 are provided on both sides of the recess 22 in the width direction Y, in widths of the first inclined portion 81 and the second inclined portion 82 are gradually increased from the inflow opening 23a toward the first valve seat 24b and the second valve seat 25b. That is to say, as shown in FIG. 4, the first inclined portion 81 and the second inclined portion 82 are formed into tapered shapes in the plan view viewed from the diaphragm side 41.
Since the depth from the diaphragm 41 to the first inclined portion 81 gradually decreases from the inflow opening 23a toward the outflow opening 24a as described above, a cross-section area of the passage near the outflow opening 24a might be insufficient.
However, in this embodiment, since the width of the first inclined portion 81 gradually increases from the inflow opening 23a toward the first valve seat 24b, the cross-section area of the passage is sufficiently secured also near the outflow opening 24a, and a smooth flow of the fluid is not hindered. Much the same is true also on a flow of the fluid from the inflow opening 23a toward the outflow opening 25a.

The depth of the first protrusion 83 from the holding surface 26 is preferably more than 0 mm, more preferably 0.3 mm or more, and preferably 1.0 mm or less, more preferably 0.7 mm or less. The depth of the first protrusion 83 from the holding surface 26 is a distances in the depth direction Z between the outer end of the first protrusion 83 in the width direction Y and an inner periphery end of the holding surface 26 (in this embodiment, the second raised portion 26a).

If the depth of the first protrusion 83 from the holding surface 26 is less than 0.3 mm, the diaphragm 41 contacts with the first protrusion 83 when the valve is shut, and wears. Thus, the durability of the valve device 1 might be deteriorated.

If the depth of the first protrusion 83 from the holding surface 26 exceed 1.0 mm, the internal volume of the valve chest 21 becomes excessively large, and thus retention of the fluid might occur.

Figure 6:
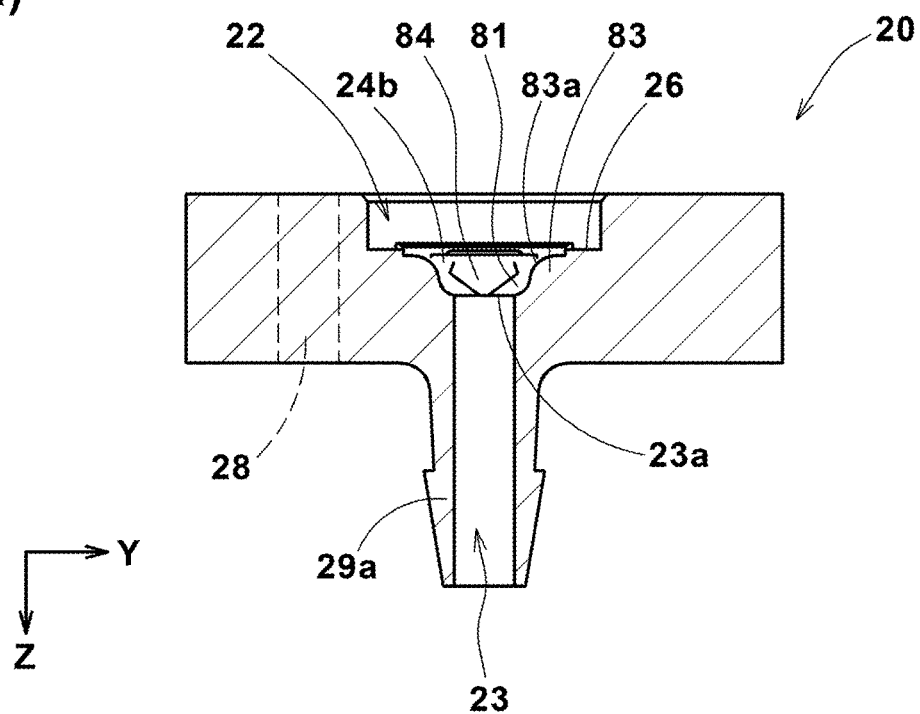
FIG. 6 (a) is a cross-section view taken along line B-B in FIG. 4, and (b) is a cross-section view taken along line c-c in FIG. 4.
Figure 6:
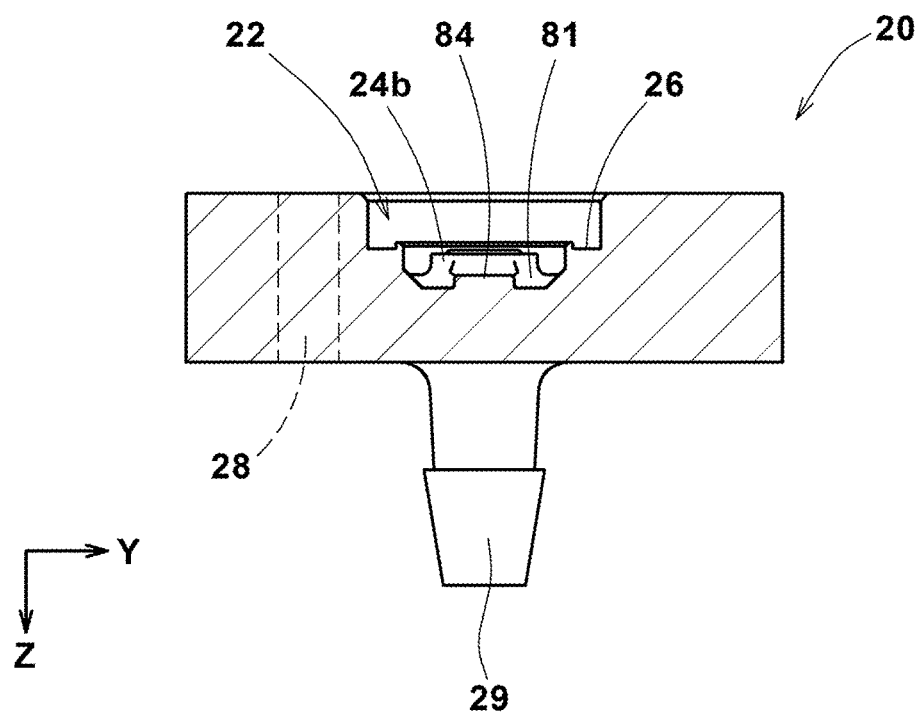

As shown in FIG. 6 (a), in an end portion of the first protrusion 83 on the inflow port 23 side (an inner end portion in the width direction Y), a third inclined portion 83a whose depth from the holding surface 26 gradually increases from the both sides of the valve chest 21 in the width direction toward the inflow port 23 is formed. The third inclined portion 83a is formed so that the angle with respect to a plane passing through the inflow opening 23a is gradually increased from each side of the valve chest 21 in the width direction toward the inflow opening 23a of the inflow port 23.

By the third inclined portion 83a. the wear caused by the contact with the diaphragm 41 is further suppressed, and thus the durability of the valve device 1 is improved. Further, the flow of the fluid from the inflow port 23 becomes smooth, and retention of the fluid is suppressed.

As shown in FIG. 4, in a plan view viewed from the diaphragm side 41, it is desirable that a taper angle α between the first inclined portion 81 and the second inclined portion 82 sandwiched by a pair of the first protrusions 83 is 30 degrees to 60 degrees. If the taper angle α is less than 30 degrees, when the valve is shut, the diaphragm 41 contacts with the first protrusions 83 and wears, therefore the durability of the valve device 1 might be deteriorated. Alternatively, the internal volume of the valve chest 21 does not sufficiently increase, and the effect to reduce the pumping volume is decreased.

On the other hand, if the taper angle α exceeds 60 degrees, the internal volume of the valve chest 21 becomes too large, and thus retention of the fluid might occur.

In the first inclined portion 81 and the second inclined portion 82, there is formed a second protrusion 84 protruding toward the diaphragm 41, namely, to −Z direction.

The amount of protruding of the second protrusion 84 from the first inclined portion 81 and the second inclined portion 82 gradually increases from the inflow opening 23a toward the outflow openings 24a and 25a.

The second protrusion 84 smoothen the flow of the fluid from the inflow opening 23a to the outflow openings 24a and 25a.

Figure 3:
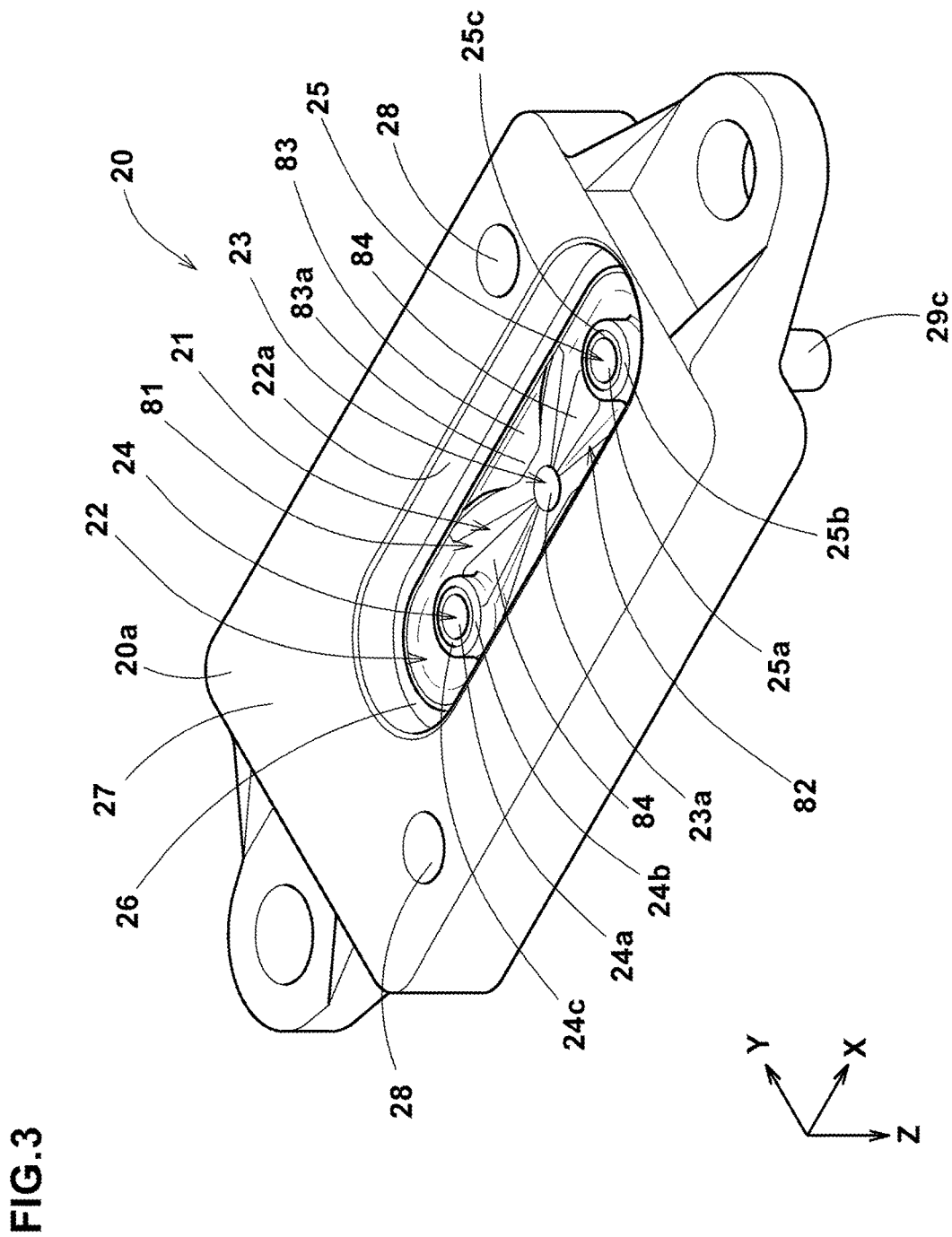
FIG. 3 A perspective view of a passage block in FIG. 1.

As shown in FIG. 3 and FIG. 6(b), the second protrusion 84 protrudes stepwise from the first inclined portion 81 and the second inclined portion 82. That is to say, the depth increases stepwise from the center in the width direction y between the first inclined portion 81 and the second inclined portion 82 toward both sides thereof.

Aside from the above-described configuration, the second protrusion 84 may be configured to protrude in the form of a slope. In this configuration, the depth from the diaphragm 41 gradually increases from the center between the first inclined portion 81 and the second inclined portion 82 in the width direction Y towards both sides thereof.

It is desirable that the length of the second protrusion 84 in the width direction Y is 0.1 mm or more. If the length of the second protrusion 84 in the width direction Y is less than 0.1 mm, the internal volume of the valve chest 21 becomes too large, and thus retention of the fluid might occur, and the flow of the fluid is not likely to be sufficiently smoothened.

It is desirable that the amount of protruding of the second protrusion 84 from the first inclined portion 81 and the second inclined portion 82 is 0.1 mm to 1.0 mm. If the protruding amount of the second protrusion 84 is less than 0.1 mm, the internal volume of the valve chest 21 becomes excessively large, and retention of the fluid might occur. Further, the flow of the fluid is not likely to be sufficiently smoothened. If the amount of protruding of the second protrusion 84 exceeds 1.0 mm, then, when the valve is shut, the diaphragm 41 contacts with the first protrusion 83 and wears, therefore, the durability of the valve device 1 might be deteriorated.

Figure 7:
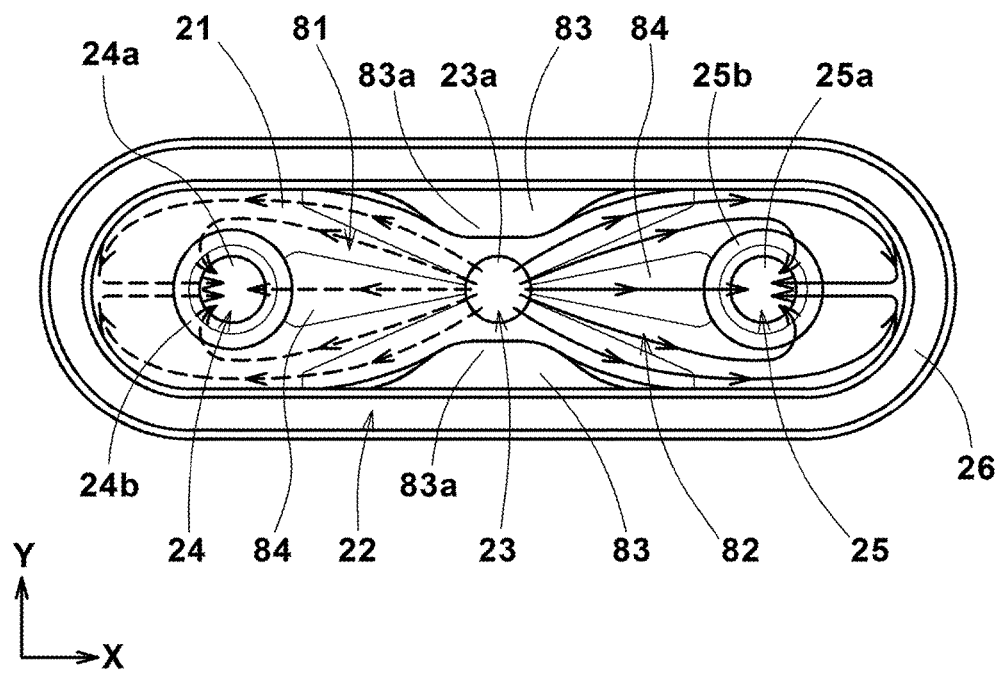
FIG. 7 A plan view illustrating a flow of a fluid in the valve chest.
Figure 7:
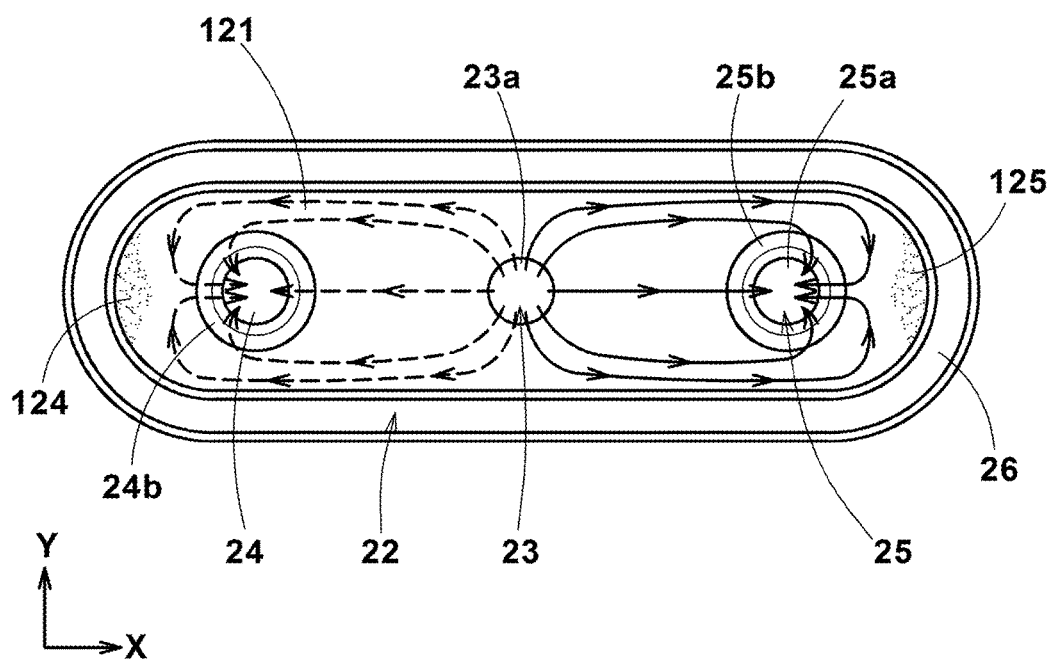

FIG. 7 (a) illustrates flow of a fluid in the valve chest 21 of the passage block 20 according to this embodiment having the first inclined portion 81, the second inclined portion 82, the first protrusion 83, and the second protrusion 84.

FIG. 7(b) illustrates flow of a fluid in a valve chest 121 of a passage block 120 not having the first inclined portion 81, the second inclined portion 82, the first protrusion 83, and the second protrusion 84.

The flow of the fluid when the outflow opening 24a is shut by the diaphragm 41 is indicated by an arrow of a solid line. The fluid flowed into the valve chest 21 from the inflow opening 23a of the inflow port 23, flows along the second protrusion 84 on the second inclined portion 82 side, and flows across the second valve seat 25b, and then is discharged from the outflow opening 25a. At this time, the fluid flowing along the second inclined portion 82 on both sides of the second protrusion 84 in the width direction Y, flows around the second valve seat 25b and flows across the second valve seat 25b and then is discharged from the outflow opening 25a.

On the other hand, the flow of the fluid when the outflow opening 25a is shut by the diaphragm 41 is indicated by an arrow of a broken line. The flow of the fluid in this case is also similar to the above-described case.

As shown in FIG. 7 (a), in the passage block 20 according to this embodiment, the fluid can be smoothly moved as the passage in the valve chest 21 is formed as shown in FIG. 7 by the first inclined portion 81, the second inclined portion 82, the first protrusion 83, and the second protrusion 84. As a result, retention of the fluid in the valve chest 21 can be effectively suppressed.

On the contrary, in the passage block 120 not having the first inclined portion 81, the second inclined portion 82, the first protrusion 83, and the second protrusion 84 as shown in FIG. 7(b), the smooth movement of the fluid is not secured, and retention of the fluid might occur particularly in a rear surface region 124 of the first valve seat 24b and a rear surface region 125 of the second valve seat 25b.

FIGS. 3 to 5 illustrate the three-way valve type passage block 20 having the single inflow port 23 and the two outflow ports 24 and 25. Such passage block 20 can be used as a two-way valve by always shutting any one of the outflow ports 24 and 25, for example, the outflow port 24. Even in such usage, owing to the functions of the second inclined portion 82, the first protrusion 83 and the second protrusion 84, it is possible to obtain the effects similar to the above, namely, the effect to reduce the pumping volume and the effect to suppress the retention of the fluid. Much the same is true on a case where the other outflow port 25 is always shut.

Figure 8:
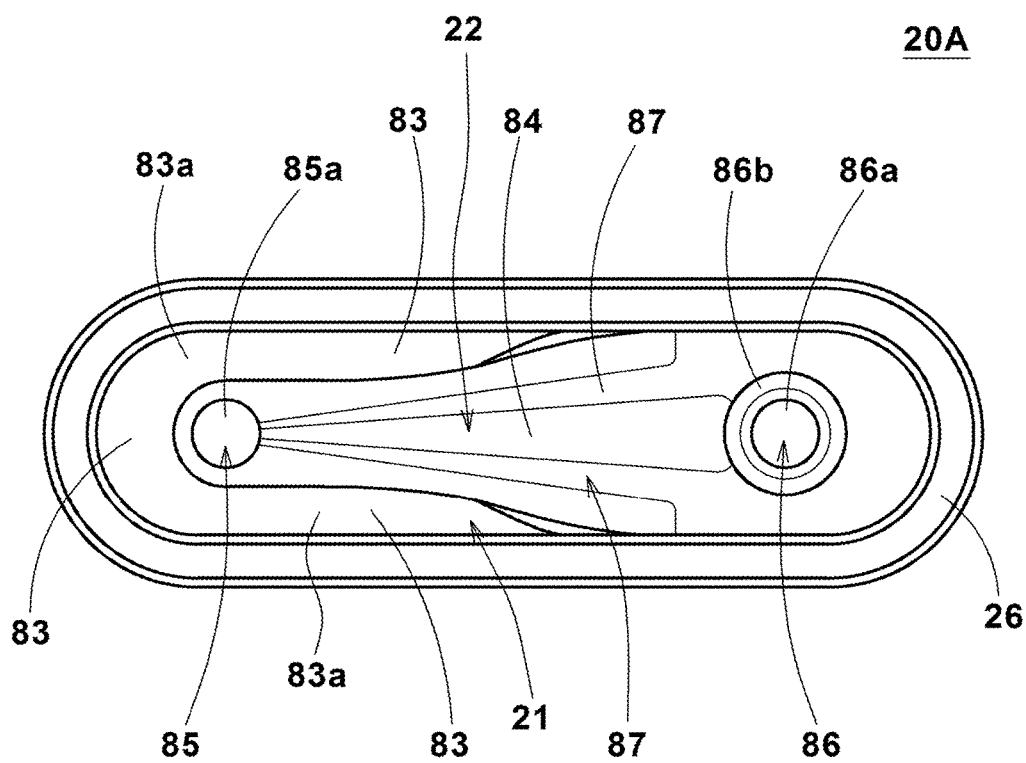
FIG. 8 A plan view of a modified example of the passage block viewed from the diaphragm side.

FIG. 8 illustrates a passage block 20A that is a modified example of the passage block 20. The passage block 20A is configured as a two-way valve having an inflow port 85 and an outflow port 86 near the both ends of the valve chest 21.

The inflow port 85 is equivalent to the inflow port 23 shown in FIG. 3 to FIG. 5, and has an inflow opening 85a which opens so as to face the recess 22. The outflow port 86 is equivalent to the NC outflow port 24 or the NO outflow port 25, and has an outflow opening 86a which opens so as to face the recess 22. The outflow opening 86a of the outflow port 86 is provided with a valve seat 86b. The valve seat 86b is formed into a cylindrical shape protruding toward the diaphragm 41. According to the oscillation of the oscillation valve 4, the diaphragm 41 closely contacts with the valve seat 86b to shut the outflow port 86, and outflow of the fluid is stopped. When the diaphragm 41 is separated from the valve seat 86b, the outflow port 86 is opened, and the outflow of the fluid is restarted.

The passage block 20A has the inclined portion 87 in the recess 22. The inclined portion 87 is formed so that its depth from the diaphragm 41 gradually increases from the valve seat 86b toward the inflow opening 85a.

By the inclined portion 87, the volume in the vicinity of the inflow opening 85a is increased, and the entire internal volume of the valve chest 21 is also increased. As a result, similar to the passage block 20, the pumping volume can be sufficiently reduced. Further, since the depth of the recess 22 from the diaphragm 41 gradually decreases from the inflow opening 85a toward the outflow opening 86a due to the inclined portions 87, it is possible to obtain the passage which is smooth from the inflow opening 85a to the outflow opening 86a. As a result, the flow of the fluid in the valve chest 21 becomes smooth, and retention of the fluid is suppressed.

Further, the passage block 20A has the first protrusion 83 and the second protrusion 84. In this embodiment, the first protrusion 83 is formed so as to surround a most part of a periphery of the inflow port 85. But, the first protrusions 83 may be formed only on both sides of the inflow port 85 in the width direction Y. Similar to the passage block 20, the first protrusions 83 is provided with the third inclined portion 83a. The second protrusion 84 is disposed in the inclined portion 87.

Even in the passage block 20A, owing to the functions of the first protrusion 83, the second protrusion 84, and the inclined portion 87, it is possible to obtain the effects similar to the above, namely, the effect to reduce the pumping volume and the effect to suppress the retention of the fluid.

In the valve device 1 according to the present embodiment having the structure as described above, the recess 22 is provided therein with the first inclined portion 81 and the second inclined portion 82 whose depths from the diaphragm 41 gradually increase toward the inflow opening 23a from the first valve seat 24b and the second valve seat 25b, therefore, the internal volume of the valve chest 21 is increased.

As a result, the ratio of the pumping volume to the internal volume of the valve chest 21 becomes small, and most part of the fluctuation in the internal volume of the valve chest 21 associated with the oscillation of the diaphragm 41 is absorbed as a fluctuation in the interior pressure of the valve chest 21. Therefore, the pumping volume can be sufficiently reduced without giving a large difference between the cross-section area of the inflow port 23, and the cross-section area of the NC outflow port 24 and the cross-section area of the NO outflow port 25.

On the other hand, there is concern that the fluid is retained in the valve chest 21 when the internal volume of the valve chest 21 is simply increased. Such retention of the fluid in the valve chest 21 is sometimes not preferable from a viewpoint of improving the measurement accuracy of an analyzing device.

In the present invention, however, the retention of the fluid in the valve chest 21 is suppressed since the first inclined portion 81 and the second inclined portion 82 are formed so that a fluid smoothly flows from the inflow opening 23a to the first valve seat 24b and the second valve seat 25b.

While detailed description has been made of the valve device according to the present invention, the present invention can be embodied in various forms without being limited to the above specific embodiment.

WORKING EXAMPLES

The valve device having the basic structure shown in FIG. 1 was experimentally manufactured based on specifications in Table 1, and tested for the pumping volume. As the material of the passage block PPS (polyphenylene sulfide) was used. The passage blocks having the respective specifications were experimentally produced by shaping a block made of PPS into a predetermined shape by the use of a cut processing machine. The test methods are as follows.

<Pumping Volume>

The passage blocks with the respective specifications were each incorporated into the valve device, and the pumping volume was measured. That is to say, all the ports were filled with water, a voltage of 12 V was applied to the solenoid coil, and a change in a water level in a tube connected to the outflow port was measured. A value that is obtained by converting the change in the water level in the tube into a volume of the tube is the pumping volume. An all-purpose projector (V12-BS produced by Nikon corporation) was used for the measurement of the water level. The results are index numbers based on the value in comparative example 1 being 100, wherein the smaller numerical value indicates that the smaller pumping volume and the operating accuracy of the valve device is excellent.

<Retention Property of Fluid>

Analytical models corresponding to the passage blocks with the respective specifications were made, and through a computer simulation, the retention property of fluid in the valve chest was calculated. The results are index numbers based on the value in comparative example 1 being 100, wherein the smaller numerical value indicates that the retention of fluid is suppressed.

TABLE 1

|  | Comparative Example 1 | Working Example 1 | Working Example 2 | Working Example 3 | Working Example 4 | Working Example 5 |
|---|---|---|---|---|---|---|
| Depth DA (mm) of first/second valve seats | 1.8 | 1.8 | 1.8 | 1.8 | 1.8 | 1.8 |
| Depth DB (mm) of inflow opening | 2.3 | 2.3 | 2.3 | 2.3 | 2.3 | 2.3 |
| DB − DA | 0.5 | 0.5 | 0.5 | 0.5 | 0.5 | 0.5 |
| Inclination angle θ of first/second inclined portions | 7 | 7 | 7 | 7 | 7 | 7 |
| Taper angle α (deg.) of first/second inclined portions | 0 | 30 | 30 | 45 | 60 | 70 |
| Depth (mm) of first protrusion | No protrusion | 0.5 | 0.5 | 0.5 | 0.5 | 0.5 |
| Third inclined portion | None | None | Present | Present | Present | Present |
| Width (mm) of second protrusion | No protrusion | No protrusion | No protrusion | No protrusion | No protrusion | No protrusion |
| Protruding amount (mm) of second protrusion | No protrusion | No protrusion | No protrusion | No protrusion | No protrusion | No protrusion |
| Pumping volume (index number) | 100 | 60 | 60 | 60 | 60 | 60 |
| Accumulation property of fluid (index number) | 100 | 95 | 93 | 90 | 95 | 98 |

|  | Working Example 6 | Working Example 7 | Working Example 8 | Working Example 9 | Working Example 10 |
|---|---|---|---|---|---|
| Depth DA (mm) of first/second valve seats | 1.8 | 1.8 | 1.8 | 1.8 | 1.8 |
| Depth DB (mm) of inflow opening | 2.3 | 2.3 | 2.3 | 2.3 | 2.3 |
| DB − DA | 0.5 | 0.5 | 0.5 | 0.5 | 0.5 |
| Inclination angle θ of first/second inclined portions | 7 | 7 | 7 | 7 | 7 |
| Taper angle α (deg.) of first/second inclined portions | 45 | 45 | 45 | 45 | 45 |
| Depth (mm) of first protrusion | 1 | 0.5 | 0.5 | 0.5 | 0.5 |
| Third inclined portion | Present | Present | Present | Present | Present |
| Width (mm) of second protrusion | No protrusion | 0.1 | 1.5 | 1.5 | 1.5 |
| Protruding amount (mm) of second protrusion | No protrusion | 0.1 | 0.1 | 1 | 1.5 |
| Pumping volume (index number) | 55 | 50 | 45 | 30 | 25 |
| Accumulation property of fluid (index number) | 90 | 85 | 80 | 80 | 75 |

As is clear from Table 1, the pumping volume in the valve devices of working examples is significantly smaller than that in comparative example, and thus can contribute to an improvement of the operating accuracy.

REFERENCE SIGNS LIST 1 valve device
2 casing
3 sub block (second block)
5 Valve driving section (diaphragm driving means)
20 Passage block (first block)
20A Passage block (first block)
21 Valve chest
22 Recess
23 Inflow port
23a Inflow opening
24 NC outflow port (first outflow port)
24b First valve seat
25 NO outflow port (second outflow port)
25b Second valve seat
41 Diaphragm
55 Solenoid coil
51 First plunger
81 First inclined portion
82 Second inclined portion
83 First protrusion
84 Second protrusion
85 Inflow port
85a Inflow opening
86 Outflow port
86b Valve seat
87 Inclined portion

The invention claimed is:

1. A valve device having
a recess provided in a casing;
a diaphragm covering the recess so as to form a valve chest as a space between the recess and the diaphragm in which a fluid flows;
an inflow port opened at the recess and allowing the fluid to flow into the valve chest;
an outflow port opened at the recess and allowing the fluid to flow out from the valve chest; and
a diaphragm driving means for oscillating the diaphragm to allow the diaphragm to closely fit to or separate from a valve seat formed by an opening of the outflow port so as to shut or open the outflow port, characterized in that
the recess has an inclined portion whose depth gradually increases from the valve seat side toward an inflow opening where the inflow port communicates with the valve chest,
the valve chest has a vertical direction in which the outflow port and the inflow port are arranged, and a width direction orthogonal to the vertical direction and the direction of the depth, and by a first protrusion provided on each side of the inflow opening in the width direction, the inclined portion has a taper shape in which the width is gradually increased from the inflow opening toward the valve seat.

2. The valve device as set forth in claim 1, wherein, from the both sides of the valve chest in the width direction toward the inflow opening, the first protrusion is gradually increased in the inclination with respect to a plane passing through the inflow opening.

3. The valve device as set forth in claim 1, wherein the outflow port is provided as a dual system including a first outflow port and a second outflow port, the diaphragm driving means oscillates the diaphragm so as to allow the diaphragm to closely fit to any one of a first valve seat formed by an opening of the first outflow port and a second valve seat formed by an opening of the second outflow port, and thereby the fluid in the valve chest is allowed to flow out from the other side of the first outflow port or the second outflow port, the recess has a first inclined portion whose depth gradually increases from the first valve seat side toward the inflow opening where the inflow port communicates with the valve chest, and a second inclined portion whose depth gradually increases from the second valve seat side toward the inflow opening, the first outflow port, the inflow port, and the second outflow port are disposed in this order, and the first inclined portion and the second inclined portion are gradually increased in the width from the inflow opening toward the first valve seat and the second valve seat.

4. The valve device as set forth in claim 1, wherein inclined portion has a taper angle of 30 to 60 degrees in a plan view viewed from the diaphragm side.

5. The valve device as set forth in claim 1, wherein, in a peripheral edge of the recess, a holding surface closely fitting to the diaphragm and holding the diaphragm is formed, and the depth from the holding surface to the first protrusion is more than 0 mm.

6. The valve device as set forth in claim 1, wherein the inclined portion is provided with a second protrusion protruding toward the diaphragm.

7. The valve device as set forth in claim 1, wherein a depth of the inflow opening is more than a depth of the valve seat.

8. The valve device as set forth in claim 7, wherein the difference between the depth of the inflow opening and the depth of the valve seat is 0.3 mm or more.

9. The valve device as set forth in claim 1, wherein the valve seat protrudes toward the diaphragm.

10. The valve device as set forth in claim 1, wherein the inclined portion inclines at an angle of 3 degrees to 15 degrees with respect to a plane passing through the inflow opening.

11. The valve device as set forth in claim 1, wherein the casing includes a first block on which the recess is formed and a second block fixed to the first block and holding the diaphragm, and when a mating surface between the first block and the second block is used as a reference surface, the depth DA of the valve seat is 1.5 mm to 2.5 mm, and the depth DB of the inflow opening is 2.0 mm to 3.0 mm.

12. The valve device as set forth in claim 1, wherein the diaphragm driving means includes a coil and a plunger giving displacement to the diaphragm when the coil is electrified.

* * * * *